(12) United States Patent
Hoernicke et al.

(10) Patent No.: US 12,436,913 B2
(45) Date of Patent: Oct. 7, 2025

(54) NON-MTP MODULE INTEGRATION

(71) Applicant: ABB Schweiz AG, Baden (CH)

(72) Inventors: Mario Hoernicke, Landau (DE); Katharina Stark, Weinheim (DE)

(73) Assignee: ABB Schweiz AG, Baden (CH)

( * ) Notice: Subject to any disclaimer, the term of this patent is extended or adjusted under 35 U.S.C. 154(b) by 67 days.

(21) Appl. No.: 18/348,565

(22) Filed: Jul. 7, 2023

(65) Prior Publication Data
US 2024/0012783 A1 Jan. 11, 2024

(30) Foreign Application Priority Data
Jul. 8, 2022 (EP) .................................. 22183909

(51) Int. Cl.
G06F 13/42 (2006.01)

(52) U.S. Cl.
CPC ............................... G06F 13/4282 (2013.01)

(58) Field of Classification Search
CPC .................................................. G06F 13/4282
See application file for complete search history.

(56) References Cited

U.S. PATENT DOCUMENTS

| | | | | |
|---|---|---|---|---|
| 9,572,020 | B2* | 2/2017 | Brett | H04L 69/18 |
| 2007/0016896 | A1* | 1/2007 | Wittmer | G05B 19/0426 |
| | | | | 717/140 |
| 2014/0149630 | A1* | 5/2014 | Burr | G06F 13/36 |
| | | | | 710/315 |
| 2021/0089354 | A1* | 3/2021 | Nixon | G05B 19/4185 |
| 2021/0341907 | A1* | 11/2021 | Fadul | G06F 13/20 |
| 2021/0382461 | A1* | 12/2021 | Jeschin | G05B 19/41845 |
| 2021/0397163 | A1* | 12/2021 | Stark | G05B 19/41885 |
| 2022/0155765 | A1* | 5/2022 | Barth | G05B 19/41865 |
| 2022/0253040 | A1* | 8/2022 | Loke | G05B 19/418 |

OTHER PUBLICATIONS

Gmbh Semodia, "Semodia MTP-Box," product brochure, downloaded from the Internet on Jul. 6, 2023, at https://web.archive.org/web/20220518235737/https://semodia.com/en/products/mtp-box/, 10 pp. (May 18, 2022).
Hoernicke et al., "Automation architecture and engineering for modular process plants—approach and industrial pilot application," Preprints of the 21st IFAC World Congress, 8353-8358 (Jul. 12-17, 2020).
European Patent Office, Extended European Search Report in European Patent Application No. 22183909.5, 10 pp. (Jan. 26, 2023).

* cited by examiner

Primary Examiner — Henry Tsai
Assistant Examiner — Harry Z Wang
(74) Attorney, Agent, or Firm — Leydig, Voit & Mayer, Ltd.

(57) ABSTRACT

A method for non-MTP module integration includes receiving by a wrapper unit logic signals, bus signals and material signals from a non-MTP module, wherein the non-MTP module is a physical module of a process plant, wherein the logic signals comprise information of logic connections and/or functions of the non-MTP module, wherein the bus signals comprise information of outputs of a fieldbus of the non-MTP module, wherein the material signals comprise information of material connections of the non-MTP module; converting, by the wrapper unit, the bus signals to open platform communication identifier architecture, OPC UA, nodes; determining, by the wrapper unit an MTP interface using the logic signals and the material signals; and determining, by the wrapper unit, a MTP conform digital black box module, using OPC UA nodes and the MTP interface.

10 Claims, 3 Drawing Sheets

|   |   | Type | CDT | Power | Current | Voltage | NewAttributeN |
|---|---|------|-----|-------|---------|---------|---------------|
| ▶ |   |      | BlackBox | 0 | 0 | 0 | 0.0 |

|   | Type | CDT | Current | Voltage | Purity_O2 | Purity_H2 |
|---|------|-----|---------|---------|-----------|-----------|
| Stack1 |  | StackCDT | 0 | 0 |  |  |
| Stack2 |  | StackCDT | 0 | 0 |  |  |
| Status |  | StatusCDT |  |  | 0.0 | 0.0 |

← 50

|   | Type | CDT | Current1 | Voltage1 | Current2 | Voltage2 | Purity_O2 | Purity_H2 |
|---|------|-----|----------|----------|----------|----------|-----------|-----------|
| Stack1 |  | StackCDT | 0 | 0 |  |  |  |  |
| Stack2 |  | StackCDT |  |  | 0 | 0 |  |  |
| Status |  | StatusCDT |  |  |  |  | 0.0 | 0.0 |

NON-MTP MODULE INTEGRATION

CROSS-REFERENCE TO RELATED APPLICATIONS

The instant application claims priority to European Patent Application No. 22183909.5, filed Jul. 8, 2022, which is incorporated herein in its entirety by reference.

FIELD OF THE DISCLOSURE

The present disclosure generally relates to the field of module type package (MTP) in process plant engineering and, in particular, in non-MTP module integration.

BACKGROUND OF THE INVENTION

The concepts around module type package, MTP, and modular automation systems describe how process plants can be built and engineered in a more modular way, with the goal to simplify process plant engineering and life cycle management in the future. Nevertheless, there are still packages used that are not MTP-compliant and are therefore integrated in a conventional fashion.

Modular plants are gradually becoming more and more established, and the community agrees to the miscellaneous benefits provided, not only with respect to development cost but also with respect to time and material efforts. As a standardized methodology the MTP approach therefore creates the framework for interoperability between modules and orchestration system.

Furthermore, the function module, FM, concept is evolving, which can be used to develop plants in a modular fashion, but without having to stick completely to the MTP standard. If 3rd-party modules that are not MTP-compliant should be integrated, the conventional methods have to be used, which are quite manual and thus time-consuming.

BRIEF SUMMARY OF THE INVENTION

According to an aspect of the present disclosure, a method for non-MTP module integration comprises the following steps: Receiving, by a wrapper unit, logic signals, bus signals and material signals from a non-MTP module, wherein the non-MTP module is a physical module of a process plant, wherein the logic signals comprise information of logic connections and/or functions of the non-MTP module, wherein the bus signals comprise information of outputs of a fieldbus of the non-MTP module, wherein the material signals comprise information of material connections of the non-MTP module. Converting, by the wrapper unit, the bus signals to open platform communication identifier architecture, OPC UA, nodes. Determining, by the wrapper unit, an MTP interface using the logic signals and the material signals. Determining, by the wrapper unit, a MTP conform digital black box module, using OPC UA nodes and the MTP interface. Preferably, the method is a computer-implemented method.

The term "non-MTP module" as used herein, relates to a physical module of a process plant that is not compliant to the MTP technology. The MTP technology creates a framework for interoperability between modules and an orchestration system and enables process plants to be built up and engineered in a more modular way with the goal of simplifying process plant engineering and life cycle management. Thus, the non-MTP module cannot be directly used by a MTP based process automation software. Preferably, the non-MTP module is a 3rd party module.

The term "black box module", as used herein, relates to a digital module, that is also referred to as process equipment assembly, PEA, that is MTP conform, or in other words is compliant to the MTP technology. The digital module is also referred to as process equipment assembly, PEA, which is a prefabricated and well-tested module that can be assembled in different combinations in a process automation software to realize a target system, in particular a process plant. The black box module thus can be directly used by an MTP based process automation software. In other words, the black box module behaves identical to a usual digital MTP module in the process automation software, where it is in particular selected out of a plurality of available MTP modules, parametrized and integrated into a design of a process plant.

The term "wrapper unit", as used herein, is a system that is used to transform a non-MTP module, using software and conventional bus infrastructure, into an MTP compliant module/PEA. The wrapper interfaces the conventional bus interface of the non-MTP compliant module and integrates the signals in a control software. Furthermore, the wrapper module uses software to convert the non-MTP signals of the non-MTP modules into signals that are compliant to MTP.

The term "OPC UA nodes", as used herein, are variables, objects and methods published by an OPC UA server, which can be consumed by on OPC UA client.

BRIEF DESCRIPTION OF THE SEVERAL VIEWS OF THE DRAWING(S)

FIG. 3 shows a single tag data object in accordance with the disclosure.

FIG. 4 shows a multi tag data object in accordance with the disclosure.

DETAILED DESCRIPTION OF THE INVENTION

Figure 1:
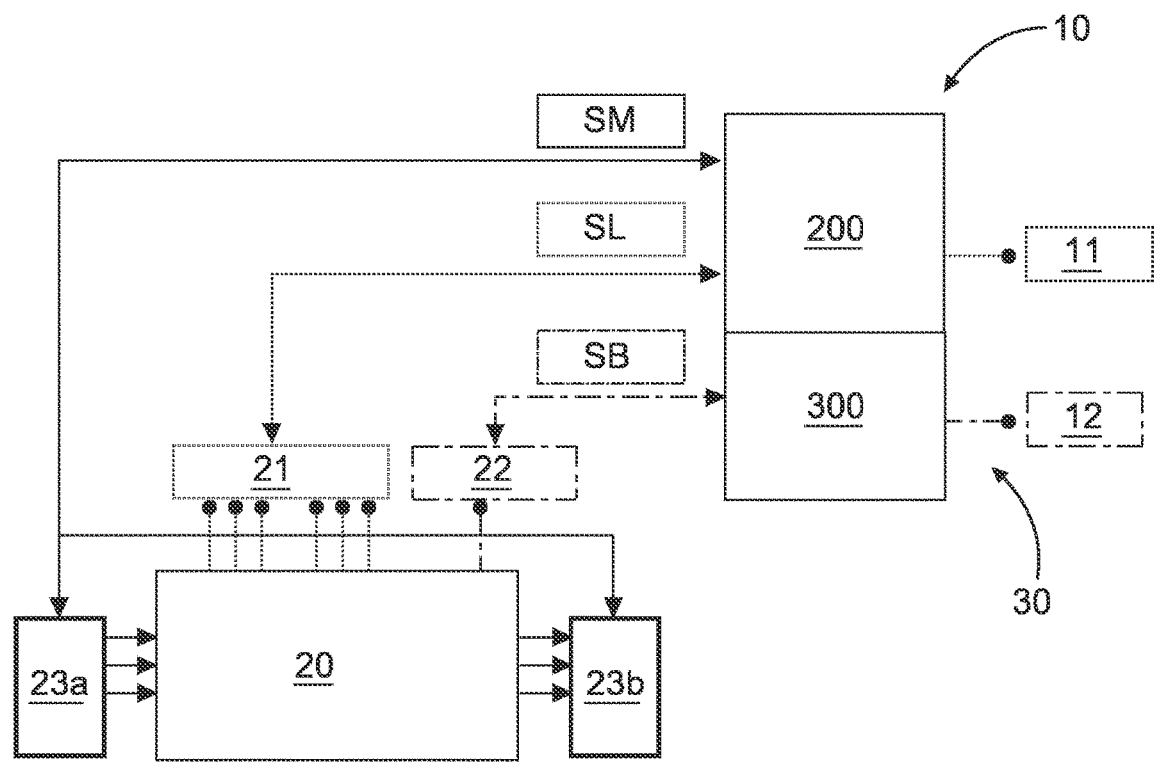
FIG. 1 shows a schematic view on a concept for wrapping a black box module in accordance with the disclosure.

The reference symbols used in the drawings, and their meanings, are listed in summary form in the list of reference symbols. In principle, identical assembly parts are provided with the same reference symbols in the figures.

Preferably, the functional modules and/or the configuration mechanisms are implemented as programmed software modules or procedures, respectively; however, one skilled in the art will understand that the functional modules and/or the configuration mechanisms can be implemented fully or assembly partially in hardware.

FIG. 1 shows a schematic view on a concept, or in other words system, for wrapping a black box module 30. A non-MTP module 20, bus signals SB and material signals SM to a wrapper unit 10. The non-MTP module 20 is a physical module of a process plant, wherein the logic signals SL comprise information of logic connections and/or functions of the non-MTP module 20 from logic signal output 21 of the non-MTP module 20, wherein the bus signals SB comprise information of outputs of a fieldbus 22 of the non-MTP module 20, wherein the material signals SM comprise information of material connections 23a, 23b (material input 23a, material output 23b) of the non-MTP module 20. The wrapper unit 10 is configured to convert the bus signals SB to open platform communication identifier architecture, OPC UA, nodes 12. The wrapper unit 10 is further configured to determine an MTP interface 11 using the logic signals SL and the material signals SM. The wrapper unit is further configured to determining a MTP conform digital black box module 30, using OPC UA nodes 12 and the MTP interface 11.

Figure 5:
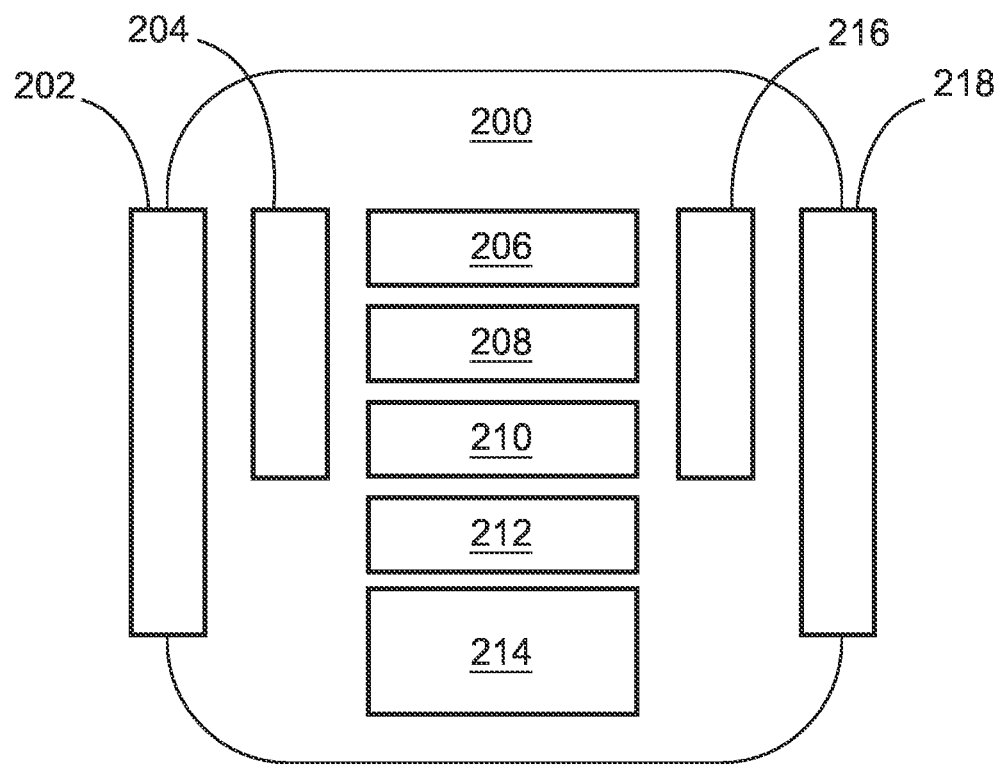
FIG. 5 shows a schematic view of a function module in accordance with the disclosure.

The MTP interface 11 is determined using a function module 200, wherein the function module 200 is a software description of a module type and is further described in FIG. 5.

The bus signals may be received by the wrapper unit 10 over a physical connection, wherein the fieldbus 22 of the non-MTP module 20 is connected to a controller 300, for example controller AC800M based on 800xA. For example, the software System 800xA 6.1.1 comprises an orchestration designer that can be used to automatically import MTP-based modules into system 800xA.

Figure 2:
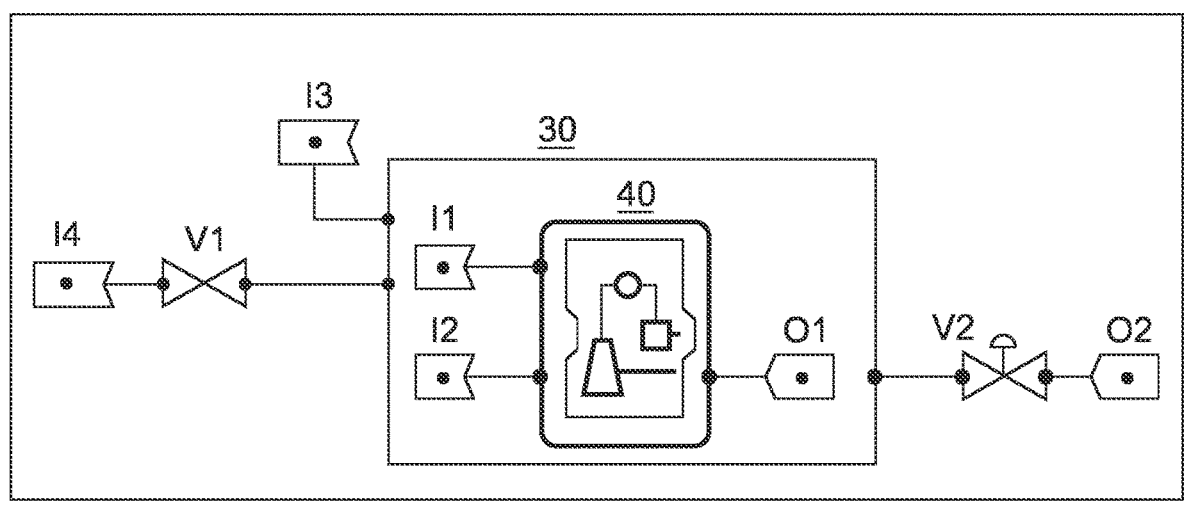
FIG. 2 shows a black box module used in process automation in accordance with the disclosure.

FIG. 2 shows a black box module 30 used in process automation. The black box module 30 comprises a first input I1 and a second input I2, as well as a first output O1. In the orchestration designer of the automation software, the user, in particular an automation engineer, selects the black box module 30 like any other MTP compliant module and connects the signals of the black box module 30 with external signals. In this case, a third input I3 is connected to the first input I1 of the black box module 30. Further, a fourth input I4 is input into a first valve V1, wherein the output of the first valve 1 is connected with the second input I2 of the black box module 30. Further, the first output O1 of the black box module 30 is connected to a second valve V2. The output of the second valve V2 is connected to a second output O2. The connections can be signal type or material type. For example, the third input I3 is a control signal, wherein the fourth input I4 indicates material flow.

FIG. 3 shows a single tag data object 50, referred to as DataAssembly. The new DataAssembly describes the parameters and signals of the black box module 30 in the wrapper unit 10. For each parameter or signal, a new attribute is defined in the "BlackBox" DataAssembly.

FIG. 4 shows a multi tag data object 50, referred to as DataAssembly. The parameters are grouped to the DataAssemblies automatically or by a user. In case one DataAssembly type is used more than once (here 'StackCDT'), the grouping of the parameters gets more complex as the parameters might need indexes (e.g., similar to an array) or the user directly assigns the different parameters to the different tags. In this case an algorithm might need to make sure that each type gets the same number and types of parameters as otherwise it cannot be mapped to one type. Here, a naming syntax is helpful.

FIG. 5 shows the content of a function module 200, also referred to as virtual PEA. The function module 200 is a software description of a module type. Broadly speaking, the function module 200 serves as a control software configuration for a module of a modular plant, specifying parameters for the said module that are not specific to any target system, such as default parameters. The function module 200, serving as the control software configuration, is provided as a controller-agnostic configuration file, in other words a target-system-independent configuration file—in one example a generic MTP—for subsequent binding of controller software instantiated according to the controller-agnostic configuration file to a hardware controller of the said module when the said module is integrated into a target system during plant engineering.

More particularly, instead of having a binding to a specific target system, the module 200 contains only the description of the functionality which the target system should contain. For example, the function module 200 may contain the same information as the module type, in addition to information concerning the logic that is executed inside the states of the services (application 214 in FIG. 2). The application 212 includes the states executed in the overarching state machine. Only the state machine is externally visible. The states are defined as extended cause-and-effect matrices, as for the module type. The application 214 optionally also contains logic that is predetermined to be executable independently of the state machines. In one example for equipment protection, if for example a valve is closed, all succeeding pumps must be stopped to prevent them from running dry. Further examples of logic that is predetermined to be executable independently of the state machines includes opening a release valve in response pressure in a vessel becoming too high and opening a release valve to flare in response to too much pressure in a gas pipeline. This kind of logic has to be executed always and independently of the services and the (specifics of the) state-machine controlling the service. Further such examples will be apparent to the skilled reader and are encompassed by this disclosure, which should not be taken as limiting to any one such example. This enables the function module 200 to be portable to different kinds of target systems, because the application 214 that should be executed within the states is not yet bound to any target system. The parameters may further specify communications for a target module.

For every control equipment (sensor, valve, etc.) used in the module, a set of parameters is defined. There may be different kinds of parameters for the module that are not specific to any target system, as in the following non-limiting examples. Further such examples will be apparent to the skilled reader and are encompassed by this disclosure, which should not be taken as limiting to any one such example.

A sensor for example has a range, meaning it can measure 1 . . . 10 bar. These parameters depend on the final hardware used—a sensor cannot measure outside its measuring range. Those parameters are set once, when later (during plant engineering) the target system and the devices are assigned and remain constant. When in different instances of the function module different sensor types are used to measure the pressure, this parameter is later adapted (e.g., during plant engineering) when the target hardware and devices are assigned to the function module instance (as an instance of a software controller instantiated according to a controller-agnostic configuration file). The block controlling a sensor can specify limits. A limit is a software-defined number that must be inside the measuring range. It can be used to raise alarms if the measure value is over/under a defined limit. These limits can be parameterized everywhere in the application. In one non-limiting example, to provide parameters that are not specific to any target system, default limits may be set, and later changed, if necessary. A typical case is that, during startup, the limits are set broader to avoid alarm floods and once the module is running in steady-state, the limits are narrowed down to keep the process in an optimal operating state.

A service might have parameters for configuration of how it should perform, e.g., the process value is measured inside the module or comes from somewhere else. The configuration parameters may show which of the sources is used. In one non-limiting example of a parameter that is not specific to any target system, a default source may be specified, in order to provide a defined state for the case in which no further parameterization is performed. Alternatively, the parameter may be forgotten during adaptation. In another non-limiting example, default service parameters may be given for setpoints, e.g., the fill service should fill the vessel to 50%.

All the above-described parameter types are typically exposed as OPC UA variables by the OPC UA server of the module. Since the OPC UA Server does not exist in the function module 900 and is only later added to the function module instance, the engineer can set default values to the parameters. Those can be (i) subsequently changed during plant engineering, (ii) provided by the actual OPC UA server of the assigned target system, or (iii) set for every state of the state machines or for every service or module wide (i.e., only one parameter value is given that is used for all operating states).

As shown in FIG. 5, the function module 200, provided as a controller-agnostic configuration file, for example in the form of a generic MTP, specifies one or more of the following for the target module: (i) one or more parameters 206, (ii) one or more variables 208, (iii) one or more views 210; (iv) one or more state machines 212; (v) one or more applications 214; (vi) one or more events 916; (vii) one or more methods 204; (viii) one or more signal references 202; (ix) one or more signal outputs 218.

The function module 200 thus provides for automation of PEAs that do not have an embedded controller and OPC UA server. The automation of the function module 200 can be carried out in a central or distributed control system and it is possible to have several function modules 200 on one controller. The function module 200 decouples the control application software from the controller and input/output hardware of a PEA. Instead of binding the control application software to hardware as a controller, input and output hardware design may be performed in later steps. The software description may be exported as the function module 200 into a controller-agnostic (in other words hardware-independent) MTP. During plant engineering, the function module 200 can then be assigned to a controller and input/output signals can be matched. Thus, it may also be possible to assign several function modules 200 to a single controller and to reuse the function module 200 with another vendor or target system later.

The concept of the function module comprises a virtual definition of the PEA described as target system independent MTP and an information of a virtual PEA, which includes parameters, variables, view, state machines, applications, events, methods, signal references, signal outputs.

Figure 6:
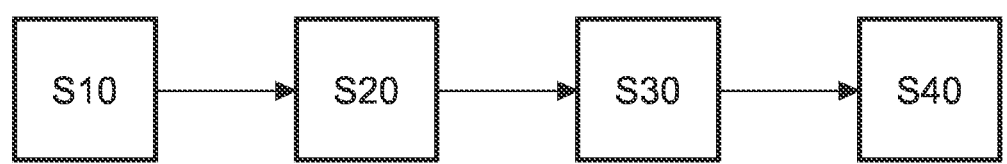
FIG. 6 shows a schematic view of a method for non-MTP module integration in accordance with the disclosure.

FIG. 6 shows a schematic view of a method for non-MTP module integration, comprising the following steps: Receiving S10, by a wrapper unit 10, logic signals SL, bus signals SB and material signals SM from a non-MTP module 20, wherein the non-MTP module 20 is a physical module of a process plant, wherein the logic signals SL comprise information of logic connections and/or functions of the non-MTP module 20, wherein the bus signals SB comprise information of outputs of a fieldbus 22 of the non-MTP module 20, wherein the material signals SM comprise information of material connections 23a, 23b of the non-MTP module 20. Converting S20, by the wrapper unit 10, the bus signals SB to open platform communication identifier architecture, OPC UA, nodes 12. Determining S30, by the wrapper unit 10, an MTP interface 11 using the logic signals SL and the material signals SM. Determining S40, by the wrapper unit 10, a MTP conform digital black box module 30, using OPC UA nodes 12 and the MTP interface 11.

LIST OF REFERENCE SYMBOLS 10 wrapper unit
11 MTP interface
12 OPC UA nodes
20 non-MTP module
21 logic signal output
22 fieldbus
23a material input
23b material output
30 black box module
40 HMI definitions
50 data object
200 function module
202 signal references
204 methods
206 parameters
208 variables
210 views
212 state machines
214 application
216 events
218 signal outputs
300 controller
SM material signal
SL logic signal
SB bus signal
I1 first input
I2 second input
I3 third input
I4 fourth input
O1 first output
O2 second output
V1 first valve
V2 second valve
S10-S40 method steps Preferably, receiving the logic signals comprises parsing, by the wrapper unit, the logic signals from a signal list, for example in form of an XML file, of the non-MTP module.

Preferably, receiving the bus signals comprises parsing, by the wrapper unit, the bus signals from a specification, for example in form of an XML file, of the non-MTP module. The bus signals preferably comprise a memory address and a respective data value stored in the memory at the memory address. Alternatively, the wrapper unit comprises a fieldbus adapter that can be directly connected to a fieldbus of the non-MTP module, wherein the fieldbus adapter is configured to read the bus signals and provide preferably the bus signals to an OPC UA server of the wrapper unit that converts the bus signals to OPC UA nodes. In other words, the non-MTP module is physically connected to the wrapper unit. The wrapper unit could for example be a controller, in particular a programmable logic controller, PLC, for example the AC800M controller. The physical connection to the controller is done using the fieldbus that is provided with the non-MTP module.

The physical connection is simply established by connecting the non-MTP module, using the needed control interface, CI, (card), to the controller. After the physical connection, the signals and parameters delivered on the fieldbus are described using logical names in the controller. Where necessary, control diagrams (e.g., FBD) or programs (e.g., ST, structured text) for reading and interpreting or writing to a signal or parameter are used. When this mapping is done, the controller can already expose the parameters and signals as OPC UA nodes. In other words, the wrapper unit wraps the physical layer uses the fieldbus adapter to the south-side of the wrapper unit and exposing the parameters through an OPC UA server to the north of the wrapper unit. Thus, when no specification of the non-MTP module is available, the non-MTP module is connected to the wrapper unit one time to analyse the bus signals, in particular at which memory address of the memory of the non-MTP module the desired bus signals is stored.

Preferably, receiving the material signals comprises parsing, by the wrapper unit, the material signals from a piping and instrumentation diagram, P&ID, for example in form of an XML file, in particular a DEXPI file, of the non-MTP module. The material signals preferably comprise physical process input and outputs of the non-MTP module.

In other words, converting the bus signals relates to wrapping the physical layer from any fieldbus, e.g., Profibus, Profinet, to OPC UA nodes.

Determining the black box model further comprises generating the MTP for the black box model. The MTP includes for example a customized DataAssembly that is specific for the black-box module. The OPC UA nodes referenced in the DataAssembly point to the OPC UA nodes of the wrapper unit that wraps the non-MTP module. Once an MTP is generated, the black-box module looks like, behaves like and can be used just like a function module in the automation software. That means it can either be integrated into another function module or it can be used directly in the topology for the process plant.

Consequently, non-MTP modules are wrapped using a wrapping unit in order to enable the non-MTP modules for automatic import, as well. This should show benefits, whenever a module type is used at least twice.

Preferably, conventional bus systems are used to connect the non-MTP module to an MTP-compliant controller, the controller can map those signals to OPC UA and the parameters of the packages can be described as a user-defined DataAssembly in the MTP. This method is useful whenever a black-box module is used several times within a plant, project, or customer company. An example would be the McLyzer module from McPhy that is used often for hydrogen plants.

Consequently, the method for non-MTP module integration allows to use a non-MTP module in a module type package-based automation software with improved efficiency.

In a preferred embodiment, determining the MTP interface comprises the following steps. Determining, by the wrapper unit, a new data object using the logic signals, wherein the data object describes parameters and signals of the black box model in an MTP conform way. Determining, by the wrapper unit, an HMI definition using the material signals and the logic signals. Determining the MTP interface using the data object and the HMI definition.

In order to provide a MTP package format, the black box module needs to comprise information about the signals and their function as well as the material that is input and output of the non-MTP module.

In a preferred embodiment, the data object is determined using an MTP information model, wrapping the logic signals of the non-MTP module into OPC UA nodes.

The MTP information model preferably comprises a DataAssembly, wherein the wrapper unit is MTP-compliant but implements additional functionality that is specific for the non-MTP module. The DataAssembly wraps all logic signals (parameters and signals of the non-MTP module) and exposes those as OPC UA nodes of the OPC server of the wrapper unit.

A tag editor is preferably used to generate a module specific DataAssembly. For smaller packages, a single tag for the entire module should be sufficient. Further preferably, the black-box module is wrapped into a DataAssembly called "BlackBox". Then the attributes of the DataAssembly are defined for example "Power", "Current", "Voltage" and "NewAttributeN". These attributes are the same as the attributes defined for the wrapper unit fieldbus mapping and can be generated from the wrapper unit configuration automatically.

In a preferred embodiment, determining the data object comprises determining a service frame to execute the black-box module.

In other words, in particular based on user input, a frame for the mirroring function module for the black-box modules, is defined. A symbol for the black-box module is added to the function module. Additionally, a frame program for a service to run the black-box module is defined.

For the service, the parameters of the black-box module are mapped to services parameters. The service parameters can, depending on the function in the black-box module, be mapped to procedure parameters, report parameters or configuration parameters. Those parameters don't have to be described within the DataAssembly for the module.

In a preferred embodiment, determining the service frame comprises generating a state machine. Preferably, the state machine is a state machine as standardized in VDI2658 part 4, which is the definition of the service interface for the MTP. That means, the state-machine is always the same and only the state has to be filled with logic.

Preferably, a frame for a single service to execute the black-box module can be generated. A simplified state machine is generated, wherein parameters of the black-box module that needs to be configured for the execution of the module are added as service parameters. If required, the alarms and implemented control logic for the service are added, automatically or by a user, in the in the same way as for normal function modules.

In a preferred embodiment, the bus signals comprise signals from a fieldbus of the non-MTP module.

Preferably, the fieldbus, comprises a profibus, a profinet or the like.

If the bus signals comprise data points with a data address, the wrapper unit can directly map the information to OPC UA.

If the bus signals comprise non-MTP OPA UA signals. Such information is relatively complex to convert.

In a preferred embodiment, the data object is split into a plurality of data objects.

Instead of using a single tag, the black box module can be split into several tags, e.g., if there are similar or same parts used often within a single instance.

In other words, a new DataAssembly SystemUnitClass is defined in the MTP. This is derived from the DataAssembly SystemUnitClass to be able to add an instance of it to the instance hierarchy in the MTP. This SystemUnitClass shall describe all parameters and signals of the black-box module. Later, the DataAssembly can be instantiated in the MTP to defined where to find the corresponding parameters on the OPC UA server; wherein the data object comprises at least one attribute for each parameter or signal; wherein the at least one attribute is determined using the physical connections.

In a preferred embodiment, determining the HMI definition comprises the following steps. Generating an HMI symbol for the non-MTP module. Mapping the bus signals, and the logic signals to the generated HMI symbol.

The symbol preferably includes all material signals (for example pipes) and all logic signals (signals and parameters).

The symbol is preferably created automatically from a description of the black-box module.

It is important that the material signals (for example the pipe connection) and the logical signals are attached to the HMI symbol in an HMI editor of the wrapping unit. This information is later used when it is either nested into another function module or instantiated in a topology designer of the automation software.

In a preferred embodiment, the mapping of the logic signals comprises determining a combined logic signal, combining a plurality of logic signals.

Especially non-MTP modules with many status information values, might result in many outputs for the wrapping unit. If the outputs are taken as they are and there are a lot of status information values, the HMI symbol gets quite big but therefore it's easy for the user (automation engineer) to connect. Thus, the user could mark which logic signals he wants to group together. This combined logic signal is then taken as a structured signal. A new structured data type is added. The MTP reflects this data type, as e.g., AttributeList or DataAssembly. The determination of a combined logic signal is alternatively automatically performed. Preferably, automatic grouping is performed by identifying patterns within a module and afterwards do a pattern matching of the equipment of the module. For every occurrence of a pattern, a group could be created. Another way of automatic implementation comprises identifying buffers in the process, e.g., storage vessels, and traverse upstream and downstream. Every upstream and every downstream path could be an own group.

According to an aspect of the invention a wrapper unit for non-MTP module integration, is configured for: Receiving logic signals, bus signals and material signals from a non-MTP module, wherein the non-MTP module is a physical module of a process plant, wherein the logic signals comprise information of logic connections and/or functions of the non-MTP module, wherein the bus signals comprise information of outputs of a fieldbus of the non-MTP module, wherein the material signals comprise information of material connections. Converting the bus signals to OPC UA nodes. Determining an MTP interface using the logic signals and the physical connection signals. Determining a MTP conform digital black box module, using OPC UA nodes and the MTP interface.

According to an aspect of the invention a black box model, as determined with the method for non-MTP module integration, as described herein, is used in an MTP-compliant control system.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for non-module type package (MTP) module integration, comprising:

receiving by a wrapper unit, logic signals, bus signals, and material signals from a non-MTP module, wherein the non-MTP module is a physical module of a process plant, wherein the logic signals comprise information of logic connections and/or functions of the non-MTP module, wherein the bus signals comprise information of outputs of a fieldbus of the non-MTP module, wherein the material signals comprise information of material connections of the non-MTP module, and wherein the material signals further comprise physical process input and outputs of the non-MTP module;

converting by the wrapper unit the bus signals to open platform communication identifier architecture, OPC UA, nodes;

determining by the wrapper unit an MTP interface using the logic signals and the material signals, wherein determining the MTP interface comprises:

determining, by the wrapper unit, a new data object using the logic signals, wherein the data object describes parameters and signals of a black box model in an MTP conform way;

determining, by the wrapper unit, a Human Machine Interface (HMI) definition using the material signals and the logic signals; and determining the MTP interface using the data object and the HMI definition; and determining by the wrapper unit a MTP conform digital black box module using OPC UA nodes and the MTP interface, wherein determining the data object comprises determining a service frame to execute the black-box module comprising defining a frame for a mirroring function module for the black box module, adding a symbol for the black box module to the mirroring function module, and defining a frame program for a service to run the black box module.

2. The method of claim 1, wherein the MTP interface is determined using a function module, wherein the function module is a software description of a module type.

3. The method of claim 1, wherein the data object is determined using an MTP information model, wrapping the logic signals of the non-MTP module into OPC UA nodes.

4. The method of claim 1, wherein determining the service frame comprises generating a state machine.

5. The method of claim 1, wherein the data object is split into a plurality of data objects.

6. The method of claim 1, wherein the bus signals comprise signals from a fieldbus of the non-MTP module.

7. The method of claim 1, wherein determining an HMI definition comprises:
   generating an HMI symbol for the non-MTP module;
   mapping the material signals and the logic signals to the generated HMI symbol.

8. The method of claim 1, wherein the mapping of the logic signals comprises determining a combined logic signal, combining a plurality of logic signals.

9. A wrapper unit for non-module type package (MTP) module integration, configured for:
   receiving logic signals, bus signals, and material signals from a non-MTP module, wherein the non-MTP module is a physical module of a process plant, wherein the logic signals comprise information of logic connections and/or functions of the non-MTP module, wherein the bus signals comprise information of outputs of a fieldbus of the non-MTP module, wherein the material signals comprise information of material connections of the non-MTP module, and wherein the material signals further comprise physical process input and outputs of the non-MTP module;
   converting the bus signals to open platform communication identifier architecture, OPC UA, nodes;
   determining an MTP interface using the logic signals and the material signals, wherein determining the MTP interface comprises:
      determining a new data object using the logic signals, wherein the data object describes parameters and signals of a black box model in an MTP conform way;
      determining a Human Machine Interface (HMI) definition using the material signals and the logic signals; and
      determining the MTP interface using the data object and the HMI definition; and
   determining a MTP conform digital black box module, using OPC UA nodes and the MTP interface, wherein determining the data object comprises determining a service frame to execute the black-box module comprising defining a frame for a mirroring function module for the black box module, adding a symbol for the black box module to the mirroring function module, and defining a frame program for a service to run the black box module.

10. The method of claim 1, wherein the material signals are received by parsing, by the wrapper unit, the material signals from a piping and instrumentation diagram.

\* \* \* \* \*